Inventor,

Thomas L. Harkins;

UNITED STATES PATENT OFFICE.

THOMAS L. HARKINS, OF BOSTON, MASSACHUSETTS.

TIPPING FORM.

1,358,729.  Specification of Letters Patent.  Patented Nov. 16, 1920.

Application filed August 18, 1919. Serial No. 318,390.

*To all whom it may concern:*

Be it known that I, THOMAS L. HARKINS, a citizen of the United States, and a resident of Boston, in the county of Suffolk and Commonwealth of Massachusetts, have invented certain new and useful Improvements in Tipping Forms, of which the following is a full, clear and exact specification.

The object of this invention is the construction of improved means for repairing the outer tube or shoe of pneumatic tires, and especially of means for so supporting the tire as to enable it to be held either vertically or laid over at an angle in either direction.

To this end I provide the segmental form, which is employed in the repairing and vulcanizing of the tire, with a pivotal support permitting the same to be swung into any desired angle required by the particular spot being repaired, and also a supporting means for the section of the tire diametrically opposite to the segmental core.

Figure 1:
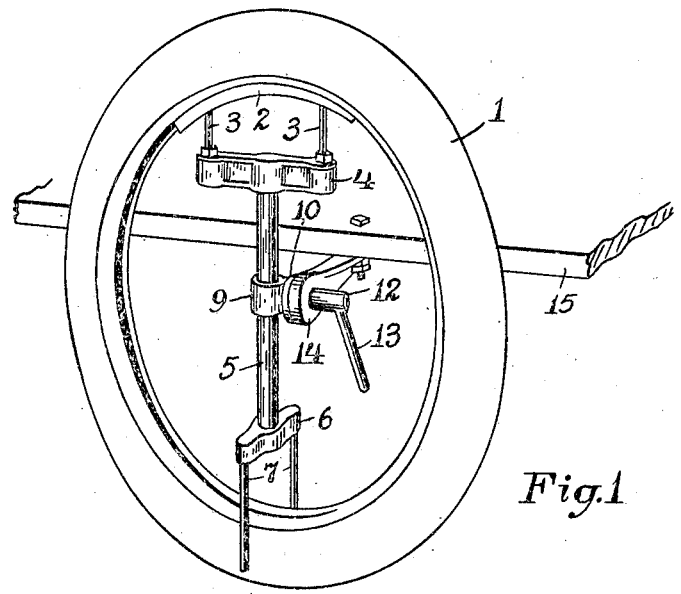
Figures 2, 3, 4:
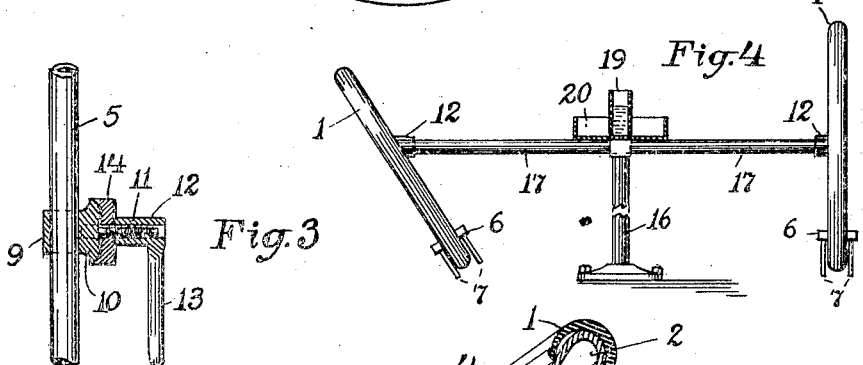

In the drawings forming part of this specification, Figure 1 is a perspective view of a repair apparatus embodying my improvements showing a tire supported thereby. Fig. 2 is a sectional elevation of the same in an oblique position. Fig. 3 is a sectional detail view of the pivotal support of the device. Fig. 4 is a side elevation of another form thereof.

In the drawings, the reference numeral 1 is an outer tube or shoe of a pneumatic tire, and 2 is the hollow cast iron core chamber customarily used in vulcanizing the part being repaired. This chamber 2 is mounted on two spindles 3 rising from a cross head 4, the latter being attached to an end of a rod 5 preferably tubular. Attached to the opposite end of the rod 5 is a second cross head 6 positioned in a plane at right angles to that of the cross head 4, and having spaced fingers 7 projecting therefrom.

At an intermediate point of the rod 5, preferably at about its midlength, is a sleeve 9 clasping the rod and having a bearing plate 10 and a bolt 11 projecting horizontally and axially therefrom. On the outer section of this bolt is an elongated nut 12 having an operating lever arm 13, the nut and bearing plate clamping between them a supporting member 14 penetrated by the bolt. The member 14 is illustrated as bolted to a shelf or bench 15, but I do not restrict myself to such means for supporting the member.

A tire having been placed upon the chamber 2 as shown, with its opposite portion between the fingers 7, the nut 12 can be unloosened to permit the rod 5 and hence the tire to be swung into any desired position, either vertical as shown in Fig. 1 and oblique as shown in Fig. 2. In the vertical position, the fingers 7 are not of especial utility, but when swung to an oblique position, the fingers are very essential in holding the lower section of the tire from bending downward and dislodging the patch being applied.

As illustrated in Fig. 3, the bearing plates 10 and 14 are made respectively concave and convex, the plate 10 being shown as conical, and the member 14 is formed with a conical recess for receiving the cone. Thus formed, I find that the two parts can be clamped so rigidly together by the nut 12 as to fully withstand all the lateral pressure applied to the tire while undergoing repairs.

In the form of the invention illustrated in Fig. 4, a standard 16 is provided, which may be bolted or otherwise fastened to the floor, and from which projects two horizontal bars 17 having the clamping members 14, 10 etc. at their ends, so that two tires may be undergoing repairs simultaneously. This arrangement permits of mounting a water receptacle 19 and also a tool holding tray 20 on the standard, the water being needed for moistening the rubber-cutting tools.

What I claim is:

1. Tire repairing apparatus comprising a member for entering the outer tube, a rod supporting said member, a supporting means for the approximate midlength of said rod comprising a pivot permitting said rod to be swung to different angles and locking means for holding the rod at the angle to which it is swung, and means at the end of said rod opposite to said member for engaging and supporting the outer tube thereat.

2. Tire repairing apparatus comprising a member for entering the outer tube, a rod having a cross head and spindles supporting said member, a pivotal supporting means for the approximate midlength of said rod, a cross head at the opposite end of said rod from said member, and spaced fingers projecting from the last-named cross head for engaging the tire thereat.

In testimony that I claim the foregoing invention, I have hereunto set my hand this 9th day of August, 1919.

THOMAS L. HARKINS.